United States Patent [19]

Stone

[11] 4,272,169
[45] Jun. 9, 1981

[54] BOUNCE FLASH APPARATUS

[76] Inventor: Kenneth Stone, P.O. Box G, Boulder Creek, Calif. 95006

[21] Appl. No.: 172,527

[22] Filed: Jul. 28, 1980

[51] Int. Cl.³ .............................................. G03B 15/02
[52] U.S. Cl. ...................................... 354/126; 362/18
[58] Field of Search ................................. 354/126–128, 354/129, 132, 148, 145, 149; 362/3, 4, 16, 17, 18

[56] References Cited

U.S. PATENT DOCUMENTS

| 1,790,250 | 1/1931 | Simjian | 362/17 |
| 3,404,612 | 10/1968 | Harvey | 354/128 |
| 4,066,885 | 1/1978 | Weinberg | 362/18 |
| 4,099,221 | 7/1978 | Carrillo | 362/18 |
| 4,242,616 | 12/1980 | Takematsu | 354/132 X |

FOREIGN PATENT DOCUMENTS 1106225  3/1968  United Kingdom ..................... 354/126

Primary Examiner—Donald A. Griffin
Attorney, Agent, or Firm—Robert G. Slick

[57] ABSTRACT

A bounce-flash reflector is provided which is highly effective in providing an even distribution of light and which is simple and compact so that it can be readily carried in a pocket or the like.

2 Claims, 6 Drawing Figures

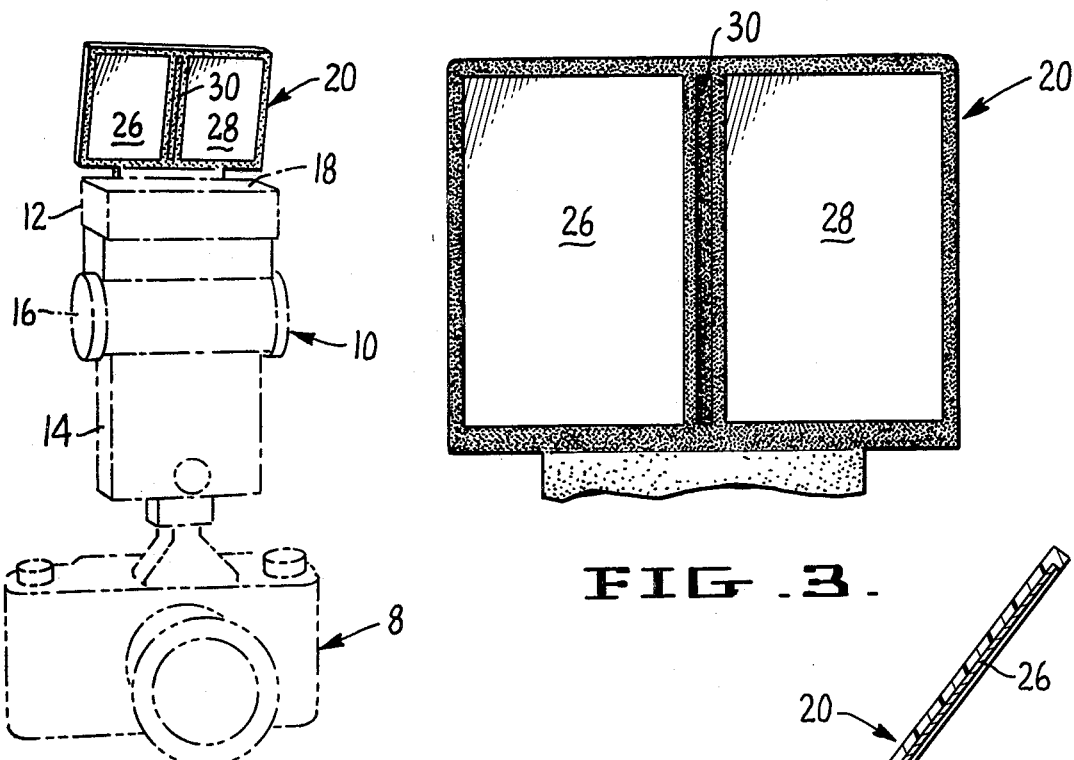

4,272,169

BOUNCE FLASH APPARATUS

SUMMARY OF THE INVENTION

Bounce-flash, wherein a flash gun is aimed away from the subject and the light is bounced off of a surface and onto the subject has become very popular. In one form of bounce-flash, the flash gun is aimed directly upward and a reflector serves to reflect the light onto the subject. Bounce-flash gives a softer effect than an ordinary direct flash since harsh shadows are less likely to be produced.

The bounce-flash reflectors which have been used in the past have suffered from two defects. One is that the units have been relatively large and difficult to carry so that the reflector is frequently as large or larger than the camera and the flash gun.

A second factor is that the reflectors which have been used in the past frequently produce a "hot spot" in the center of the field rather than providing a diffused, even light over a large area.

Accordingly, it is an object of the present invention to provide a bounce-flash reflector which is very small and which can be detached readily from the flash gun and slipped into a small pocket.

Another object of the present invention is to provide a bounce-flash reflector which eliminates the "hot spot" and which provides an even, soft illumination over a large area.

The deflector of the present invention is little larger than an ordinary business calling card and is almost flat in its overall configuration so that it can easily be carried in a shirt pocket. Preferably it is made from a tough plastic so that it is not easily broken even when carried in a pocket.

It has been found that the efficiency of a reflector is much higher in the sense of having a more uniform light field if the reflector is divided into two parts. In accordance with the present invention, the reflector consists of two separate reflecting surfaces, separated a short distance from each other by a black, non-reflecting surface.

The reflector of the present invention is easily held on a bracket which can be permanently attached to the flash gun without substantially increasing the size of the flash gun. The reflector is then easy to slip in and out of the bracket.

Other objects and features of the invention will be brought out in the balance of the specification.

BRIEF DESCRIPTION OF THE DRAWINGS

FIG. 1 is a perspective view of a reflector embodying the present invention showing it in place on a flash gun and a camera wherein the flash gun and camera are shown in phantom.

FIG. 2 is an enlarged, exploded perspective view of the reflector and the holding bracket.

FIG. 3 is an enlarged front view of the reflector.

FIG. 4 is a section on the line 4—4 of FIG. 2.

FIG. 5 is a diagramatic view of the light distribution pattern produced by the reflector of the present invention.

FIG. 6 is a view, similar to FIG. 5, showing a typical prior art reflector.

DESCRIPTION OF THE PREFERRED EMBODIMENTS

Referring now to the drawings by reference characters there is shown a camera generally designated 8 with a flash gun 10 mounted thereon. The flash gun is of the folding type, having a flash unit proper 12 connected to a body 14 by means of hinge 16. Body 14 is attached to the camera in the usual manner. The flash is emitted from the surface 18. By means of the hinge 16 one can bend the flash unit down so that the surface 18 faces directly toward the subject for a direct flash or bend the unit up to the position shown in FIG. 1 so that the light is emitted at an angle to the subject for the bounce-flash.

The bounce-flash reflector unit of the present invention consists of a rectangular reflector unit generally designated 20 having a downwardly extended lip 22 from which extends a tongue 24, forming shoulder 25. The tongue and lip form an angle of about 120° with the reflector proper as is best seen in FIG. 4.

In accordance with the present invention, the reflector surface is broken up into two panels designated 26 and 28 which are spaced apart and separated by a black, non-reflective strip 30.

Preferably the reflector unit is cast as a single piece of a tough, black plastic and the actual reflective surfaces are provided by self adhesive tabs as at 32 of a light colored plastic or paper.

In order to mount the reflector on a flash unit, a small U-shaped shallow bracket 34 is provided which has legs 36 and 38 with a recess 40 between them of such a size that tongue 24 can slip into the recess and that shoulder 25 formed between the lip 22 and the tongue rests on top of it. A small raised button 42 may be formed on the tongue 24 to provide additional friction to hold the unit in place. In use, the bracket 34 is glued onto the back of the flash unit 10. This is preferably done with one of the instant setting adhesives, such as a cyanoacrylate, now available. The bracket 34 is so small that it scarcely increases the size or weight of the flash unit. Now if one wishes to take a bounce-flash picture it is merely necessary to push the reflector into place under the bracket and it will be correctly aligned for a bounce-flash picture. If one wishes to take a direct flash picture, it is easy to slip off the reflector and restore the flash gun to the normal direct position.

In FIG. 5 there is shown an idealized form flash distribution pattern produced by the reflector of the present invention. It will be seen that the reflector 10 having the center dark strip 30 and the two reflective surfaces 26 and 28 produces a wide, flat field of substantially even illumination. On the other hand, a typical prior art reflector is shown in FIG. 6 which has no black stripe at the center. Here the illumination comes to a "hot spot" near the center of the field and the illumination falls off rapidly as one moves to the side. This illustrates the effeciency of the present invention.

It is believed apparent from the foregoing that I have provided a simple and effective reflector which gives even light distribution, which can be easily attached to an existing flash gun and which is so small and lightweight that it can easily be carried in a shirt pocket.

The subject matter to be claimed is:

1. A bounce light reflector for a flash gun wherein said flash gun has a light emitting surface aimed at right angles to a subject comprising in combination:

a. reflector having two reflective surfaces, generally equally sized,
b. said reflective surfaces being in side by side relationship and being separated by a narrow, non-reflective stripe and,
c. means for mounting said reflector onto said flash gun whereby the surface of said reflector is held at an angle to the light emitting surface of said flash gun.

2. The reflector of claim 1 wherein the mounting means comprises:
a. a tongue depending from the reflecting surfaces, and
b. a U-shaped bracket attached to said flash gun adapted to receive said tongue.

* * * * *